(12) United States Patent
Price et al.

(10) Patent No.: US 8,306,843 B1
(45) Date of Patent: Nov. 6, 2012

(54) EMPLOYEE FEEDBACK AND PROBLEM MANAGEMENT PORTAL

(75) Inventors: David D. Price, Kennewick, WA (US); Alycia DeZanet, Los Angeles, CA (US); David Kennedy, Martinez, CA (US)

(73) Assignee: Bank of America Corporation, Charlotte, NC (US)

( * ) Notice: Subject to any disclaimer, the term of this patent is extended or adjusted under 35 U.S.C. 154(b) by 333 days.

(21) Appl. No.: 12/691,827

(22) Filed: Jan. 22, 2010

Related U.S. Application Data

(60) Provisional application No. 61/265,152, filed on Nov. 30, 2009.

(51) Int. Cl.
*G06Q 10/00* (2012.01)
(52) U.S. Cl. ...................................... 705/7.27
(58) Field of Classification Search ............... 705/7.27
See application file for complete search history.

(56) References Cited

U.S. PATENT DOCUMENTS

2006/0106627 A1 * 5/2006 Al-Nujaidi .................. 705/1
* cited by examiner

*Primary Examiner* — Thomas Dixon
(74) *Attorney, Agent, or Firm* — Weiss & Arons LLP; Michael Springs

(57) ABSTRACT

Apparatus and methods for providing an electronic feedback management system. The method may use an electronic information processing platform. The method may include receiving information relating to a company employee hierarchy. The method may also include receiving information relating to the submission of a suggestion by a first employee. The method may further include receiving information relating to the status of the suggestion. The status of the suggestion may include an identification of a second employee who has viewed the suggestion. The method may also include displaying on a graphical user interface ("GUI") a visual representation of at least part of the company employee hierarchy. The display may include the identification relating to the second employee.

24 Claims, 5 Drawing Sheets

EMPLOYEE FEEDBACK AND PROBLEM MANAGEMENT PORTAL

CROSS-REFERENCE TO RELATED APPLICATION

This non-provisional application claims priority from U.S. Provisional Application No. 61/265,152 filed on Nov. 30, 2009, entitled "EMPLOYEE FEEDBACK AND PROBLEM MANAGEMENT PORTAL" which is hereby incorporated by reference in its entirety.

FIELD OF TECHNOLOGY

Aspects of the disclosure relate to systems and methods for offering an information feedback service. Specifically, the invention relates to offering an electronic employee feedback service to company employees.

BACKGROUND OF THE INVENTION

Some companies provide systems and methods for an employee to submit a written suggestion into a suggestion box. In such systems and methods, the employee is typically unaware of how the company handles his suggestion. For example, the employee may not know when his suggestion was considered and the company employee(s) who considered it. This is not desirable if a company would like their employees to be informed of the consideration given to their suggestions.

Therefore, it would be desirable to provide a service that enables company employees to view the status of a suggestion as the suggestion moves through their company. For example, it would be desirable to provide an electronic employee feedback portal that is configured to display company employee(s) that have considered the suggestion. It may also be desirable to provide an electronic employee feedback portal that displays any comments, revisions, or corrections made to the suggestion by the company employee(s). These systems and methods may be useful for a company that desires to keep its employees abreast of the development of their respective suggestions as these suggestions are evaluated.

SUMMARY OF THE INVENTION

Systems and methods for providing an electronic feedback management system are provided. The systems and methods may use an electronic information processing platform. The method may include receiving information relating to a company employee hierarchy. The method may also include receiving information relating to the submission of a suggestion by a first employee. The method may further include receiving information relating to the status of the suggestion. The status of the suggestion may include an identification of a second employee who has viewed the suggestion.

Additionally, the method may include displaying on a graphical user interface ("GUI") a visual representation of at least part of the company employee hierarchy. The display may include an identification of the second employee.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
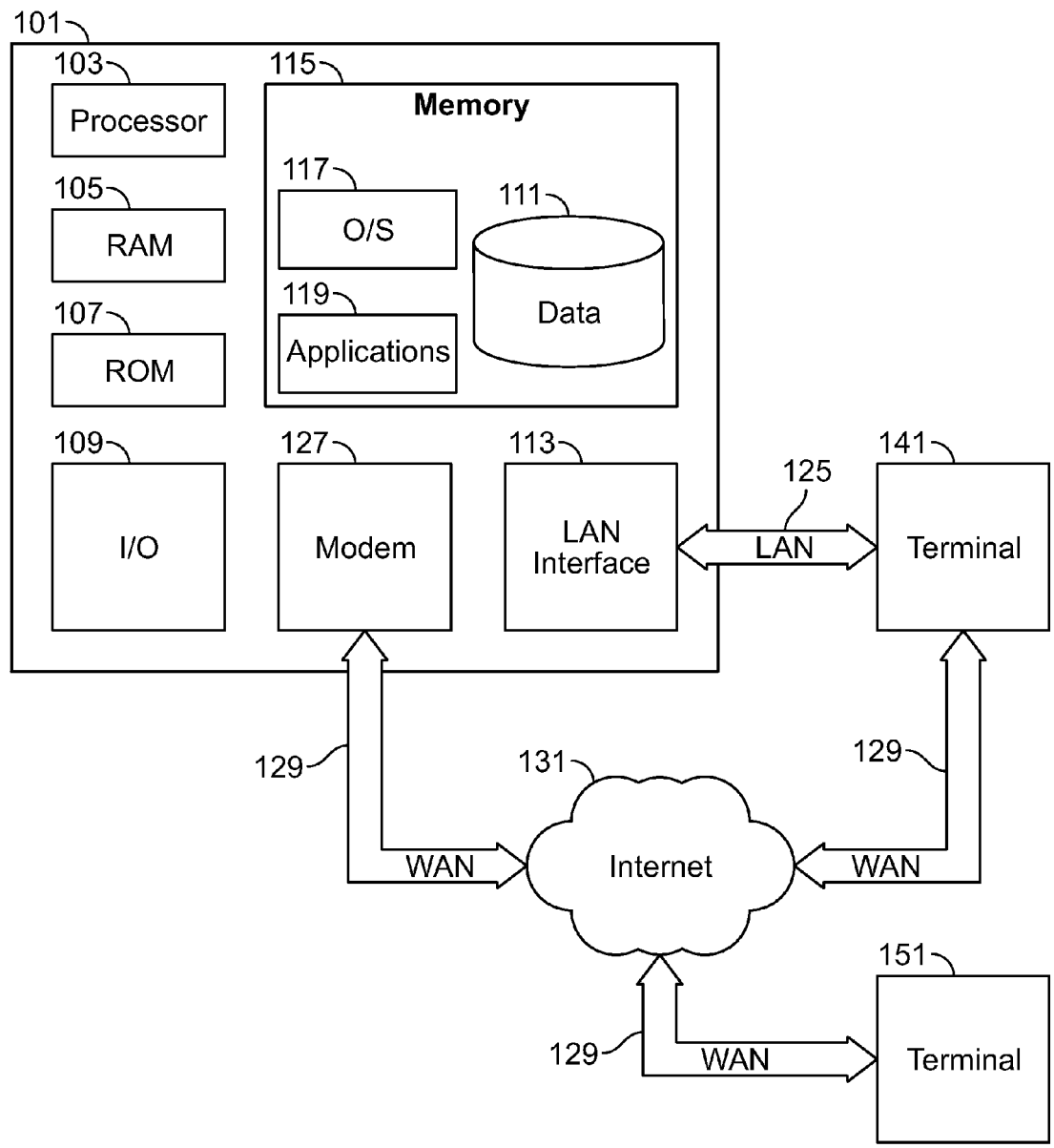
FIG. 1 is a schematic diagram of apparatus that may be used in accordance with the principles of the invention.

In systems and methods according to the invention, an electronic employee feedback portal may be provided to a company. The systems and methods of the invention may allow a company employee to upload a suggestion to the portal. The portal may include a graphical user interface that enables the employee to monitor his suggestion as it is being considered within the company.

In some embodiments of the invention, only company employees may be authorized to upload suggestions to the portal. In alternate embodiments of the invention, a customer, business partner and/or any other suitable individual may be authorized to upload suggestions to the portal. It should be noted that the electronic employee feedback portal may be provided to any suitable organization, business, institution or association.

The suggestion uploaded to the portal may include a Word™ document, a scanned document, an electronic diagram, a voice recording, a video and/or any other suitable electronic information.

The employee uploading the suggestion to the portal may include in the suggestion his name or other identifying information. In some embodiments, the employee may receive a prompt from the portal to provide identifying information. In additional embodiments, the portal may authorize the employee to submit his suggestion anonymously.

The portal may be included and/or accessed via a company website. Alternately, the portal may be accessed through an independent webpage. In some embodiments of the invention, the portal may be operated by the company. In alternate embodiments, the portal may be operated by an organization different from the company. In these embodiments, the company may be required to pay an activation fee, maintenance fee or any other suitable fee to the organization during the duration of the company's usage of the portal. In additional embodiments, the portal may be enabled by commonly available software.

The portal may be accessed via one or more usernames and/or passwords. The usernames and/or passwords may grant users different permission within the portal. In the embodiments wherein the portal is supported by an entity different from the company, each supported company may have a unique username and password. This unique username and password may enable each company to view information pertinent to the submissions received by its respective employees.

In additional embodiments of the invention, various employees within the same company may be given different usernames and/or passwords that provide diverse authorization privileges within the portal. For example, a company president's username and password may authorize him to view the status of all suggestions that have been submitted to the portal since the portal's initialization. A company employee, in contrast, may be provided with a username and password upon the submission of a suggestion. This username and password may authorize the employee to view the status of his personal submission.

When an employee uploads a suggestion to the portal, he may be prompted to answer one or more queries. The one or more queries may pertain to the subject matter of the submission and a company employee and/or a company division to which the employee wishes his suggestion to be transferred to.

The suggestion uploaded to the portal may be automatically forwarded to one or more company employees. A company employee who may receive the suggestion may include a company associate, manager, executive, vice president, president and/or company chair. In some embodiments of the invention, a portion of a company division may receive the suggestion. For example, the Board of Directors, Stockholders Committee, Supervisors and/or the products division, management division, sales and marketing division or any other division may concurrently receive the suggestion.

The employee(s) to whom the suggestion is forwarded may be predetermined using an algorithm. The algorithm may use information provided by the submitter to determine the employee(s) who are to receive the suggestion. For example, the identity of the submitter, the submitter's position in the company hierarchy, key words included in the submitted suggestion and any other useful information may be used to determine the company employee(s) most suitable to receive the suggestion.

In alternative embodiments of the invention, the submitter may be authorized to determine to whom his selection will be forwarded.

A company employee may electronically receive the suggestion from the portal. The employee may receive the suggestion via e-mail. In alternative embodiments of the invention, the employee may be notified via e-mail or any other electronic prompt of the pending portal suggestion. The company employee may be provided with a username and password which authorize him to access the suggestion in the portal.

The portal, once accessed, may display the suggestion to the employee. The portal may provide the employee with the option to modify the suggestion. The employee may choose to modify the suggestion. Upon modification, the portal may display the suggestion in its original and modified format. If the suggestion has been modified by a previous employee, the previous modifications may be displayed relative to the original submission. The identity of the previous employee may be displayed alongside the previous employee's modifications. In some embodiments the portal may display a redline version of the suggestion, displaying the revisions made by the previous employee relative to the original suggestion.

The portal may provide the employee with an option to post an electronic comment and/or sticky note near the suggestion. The employee may choose to have an identifying mark accompany his comment. For example, the employee may select to post a picture of himself alongside his comment. In other embodiments of the invention, the portal may automatically include one or more identifiers identifying the employee along with his comments.

The portal may include an option for the employee to transmit the suggestion once he has viewed it. The employee may be permitted to transmit the suggestion with or without submitting revisions or comments pertaining to the suggestion. In some embodiments of the invention, the employee may be authorized to select a second employee to whom he desires to forward the suggestion. In alternative embodiments, the portal may use an algorithm to determine to whom the suggestion is to be forwarded. Whether the employee views an option to select to whom he desires the suggestion to be forwarded may depend on his status and/or authorization level within the company.

The employee may view an option to 'freeze' the suggestion. This option may allow the employee to discontinue the transmission of the suggestion through the company for a limited amount of time. The employee may also select an option to 'delete' the suggestion. This option may allow the employee to remove the suggestion permanently from the portal. It should be noted that the permissions of an employee to 'freeze' and/or 'delete' a suggestion may depend on his status and/or authorization level within the company.

The portal may display the history of the suggestion. For example, the portal may display the date that the suggestion was uploaded to the portal and the employees who viewed the uploaded suggestion. The portal may also display an amount of time that elapsed from when the suggestion was electronically available to an employee until the employee took action relating to the suggestion. The portal may additionally display the date when the employee viewed the suggestion and the specific action he took after viewing the suggestion, if any.

The portal may additionally display a visual representation of a company hierarchy. The company hierarchy may include at least some of the company employees and/or divisions. The company employees and/or divisions may be identified by their names or any other suitable identifier.

The visual representation of the company hierarchy may illustrate the path traveled by the suggestion through the company. The visual representation of the company hierarchy may further include icons next to the company employee(s) that considered the suggestion. For example, employee A may have considered a suggestion and decided to delete it. A trash can may appear next to employee A's name. In a different embodiment, employee B may have considered a suggestion and added a comment. An icon next to employee B's name may appear. This icon, when selected, may display the comment added by employee B.

It should be noted that in some embodiments of the invention, the portal may allow an employee to anonymously respond to a suggestion. In this embodiment, the portal may not display the employee's personal identification on the company hierarchy. Rather, the portal may simply identify the company division he belongs to. In these embodiments, the portal may enable the anonymous employee to be contacted via an e-mail sent through the portal.

It should additionally be noted that in some embodiments of the invention, a portion of the company employees may be authorized to comment on the suggestion. These company employees may not receive an e-mail from the portal requesting them to review the suggestion. Rather, they may use a company username and password to access the portal and comment on the suggestion. The authorizations of these company employees within the portal may be different from the authorizations of employees who have received a request from the portal to view the suggestion.

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 is a block diagram that illustrates a generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 125.

Input/output ("I/O") module 109 may include a microphone, keypad, touch screen, and/or stylus through which a user of device 101 may provide input, and may also include one or more of a speaker for providing audio output and a video display device for providing textual, audiovisual and/or graphical output. Software may be stored within memory 125 and/or storage to provide instructions to processor 103 for enabling server 101 to perform various functions. For example, memory 125 may store software used by server 101, such as an operating system 117, application programs 119, and an associated database 121. Alternatively, some or all of server 101 computer executable instructions may be embodied in hardware or firmware (not shown). As described in detail below, database 121 may provide storage for an electronic employee feedback portal, and/or any other suitable information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 123. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages via the World Wide Web from a web-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by an administrator to open, view and process suggestion information and to issue one or more instructions regarding the electronic employee feedback portal. Portal information may be stored in memory 125. The portal information may be processed by an application such as one of applications 119.

FIGS. 2-5 show flow diagrams that illustrate various embodiments of a GUI according to the invention. The GUI illustrated in FIGS. 2-5 may be part of the electronic employee feedback portal included in the systems and methods of the invention.

Figure 2:
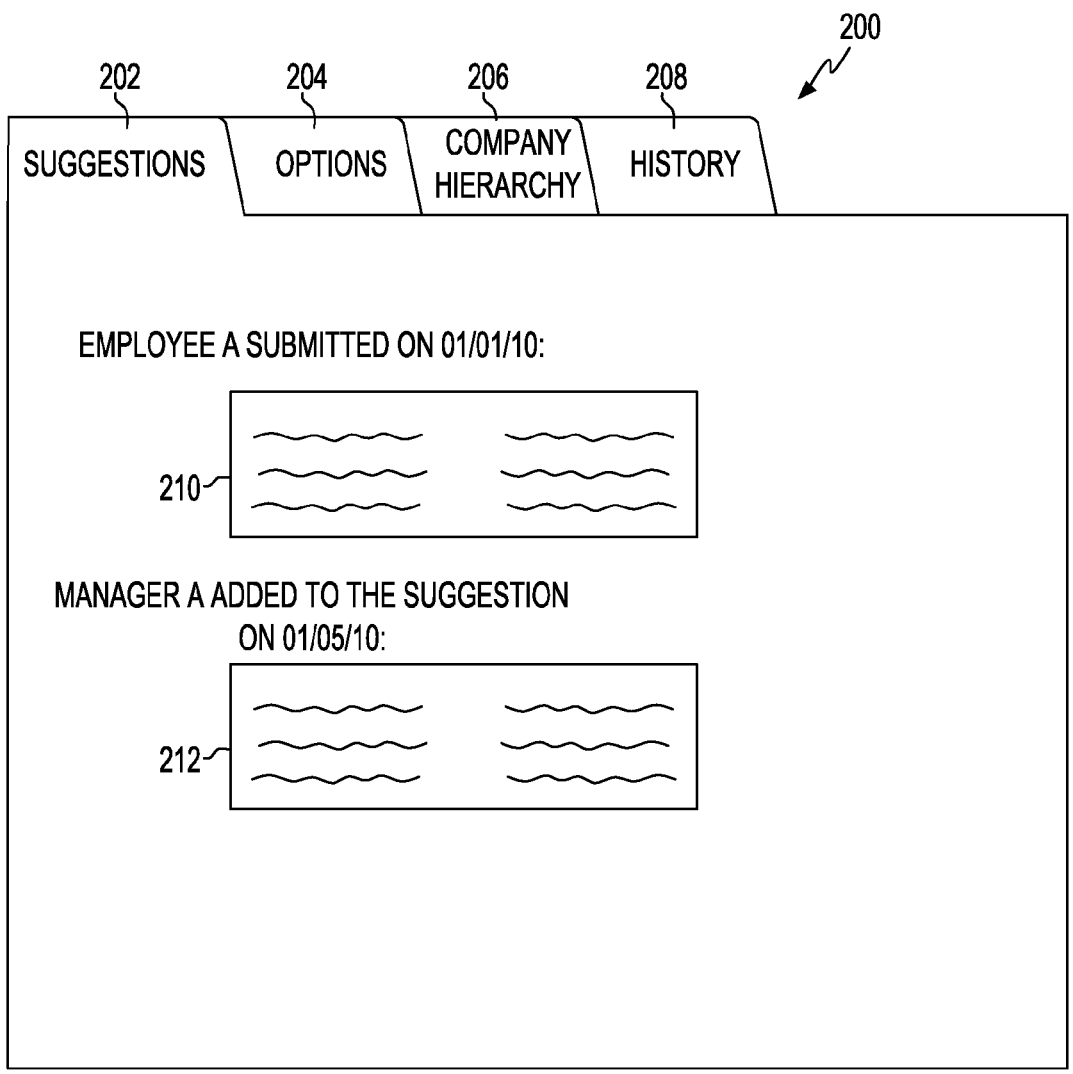
FIG. 2 shows an illustrative diagram of one embodiment of a GUI according to the invention.

FIG. 2 shows an illustrative diagram of an embodiment of a GUI according to the invention. The GUI of FIG. 2 may include suggestions tab 202, options tab 204, company hierarchy tab 206 and history tab 208. User selection of suggestions tab 202 may retrieve display 210. Display 210 may include a suggestion submitted by Employee A. Display 210 may also include the date that Employee A submitted his suggestion. User selection of suggestions tab 202 may additionally retrieve display 212. Display 212 may include an addition added to the suggestion by Manager A. Display 212 may further include the date on which Manager A electronically submitted his addition.

Figure 3:
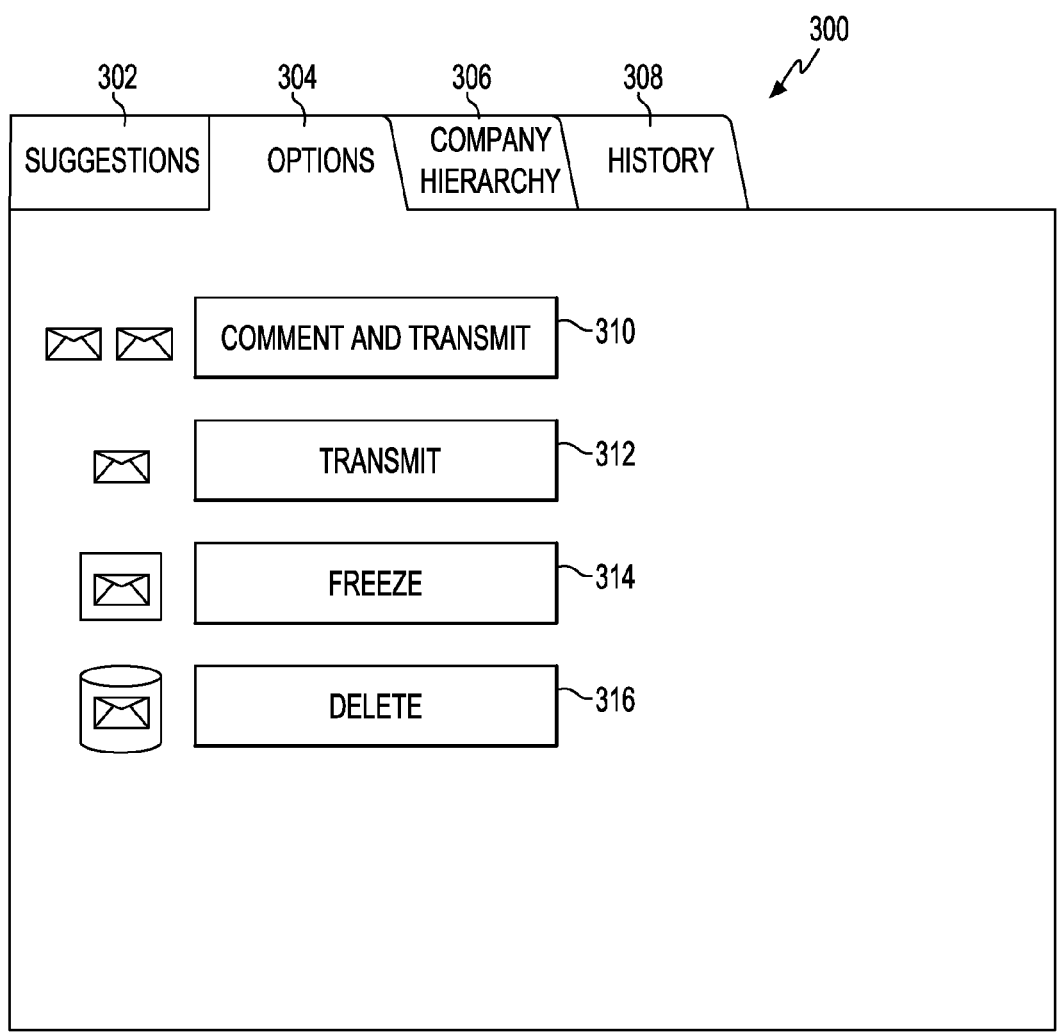
FIG. 3 shows an illustrative diagram of a second embodiment of a GUI according to the invention.

FIG. 3 shows an illustrative diagram of a second embodiment of a GUI according to the invention. The GUI of FIG. 3 may include suggestions tab 302, options tab 304, company hierarchy tab 306 and history tab 308. User selection of options tab 304 may retrieve comment and transmit icon 310. Icon 310, when selected, may allow a user to comment on a suggestion and subsequently transmit it to a different company employee. User selection of options tab 304 may also retrieve transmit icon 312. Icon 312, when selected, may allow a user to transmit the suggestion to a different company employee. User selection of option tab 304 may further retrieve freeze icon 314. Icon 314, when selected, may prevent any further transmission of the suggestion for a predetermined and/or customizable length of time. User selection of option tab 304 may additionally retrieve delete icon 316. Icon 316, when selected, may delete the submission from the portal.

Figure 4:
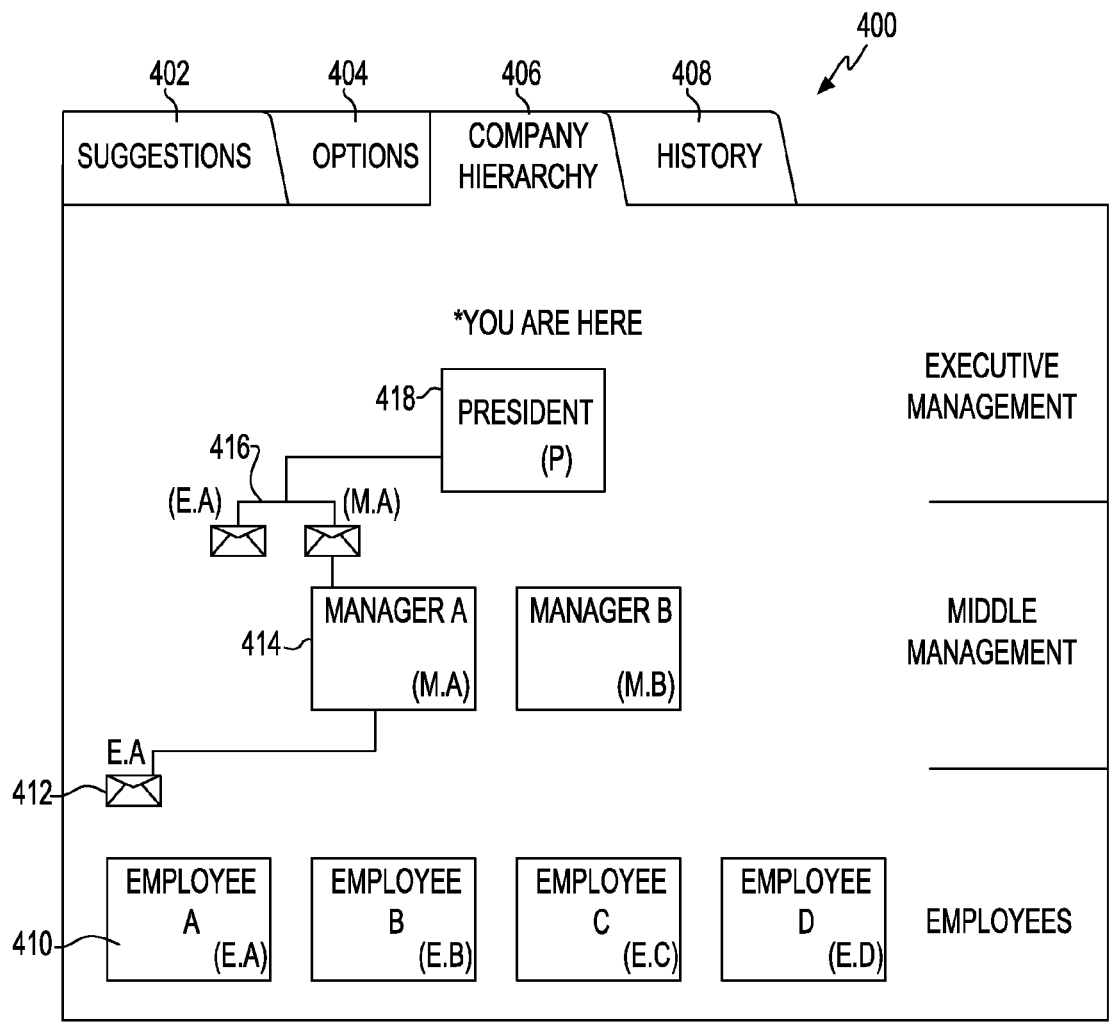
FIG. 4 shows an illustrative diagram of a third embodiment of a GUI according to the invention.

FIG. 4 shows an illustrative diagram of a third embodiment of a GUI according to the invention. The GUI of FIG. 4 may include suggestions tab 402, options tab 404, company hierarchy tab 406 and history tab 408. Company hierarchy tab 406 may retrieve visual representation 410 of Employee A. Employee A may have uploaded a submission to the portal. Icon 412 may appear near visual representation 410. Icon 412, when selected, may display the suggestion Employee A uploaded to the portal. Icon 412 may further include an identifier identifying the employee who submitted the suggestion. In this embodiment shown, an identifier "E.A." is displayed above icon 412 to clarity that Employee A has submitted the suggestion.

User selection of company hierarchy tab 406 may also retrieve visual representation 414 of Manager A. The suggestion submitted by Employee A may have been electronically transmitted to Manager A via the portal. Manager A may have added a comment to the suggestion submitted by Employee A through the portal. Icon 416 may be displayed above icon 414 to represent the comment submitted by Manager A. Icon 416, when selected, may display the comment added by Manager A in addition to the submission submitted by Employee A. Alternately, Icon 416, when selected, may display only the comment added by Manager A. In other embodiments, the comment added by Manager A may be viewed when a user selects the portion of Icon 416 labeled "M.A."

User selection of company hierarchy tab 406 may additionally retrieve visual display 418 of the company president. In this embodiment of the invention, the portal has been accessed by the company president. This is made apparent by the words "you are here" that are included in the visual display 418. It should be noted that the suggestion submitted by Employee A has been electronically transmitted from Manager A to the company president via the portal. This transmission is represented in the GUI by the line connecting icon 412, the line connecting icon 412 to icon 414, the line connecting icon 414 to icon 416, and the line connecting icon 416 to icon 418.

Figure 5:
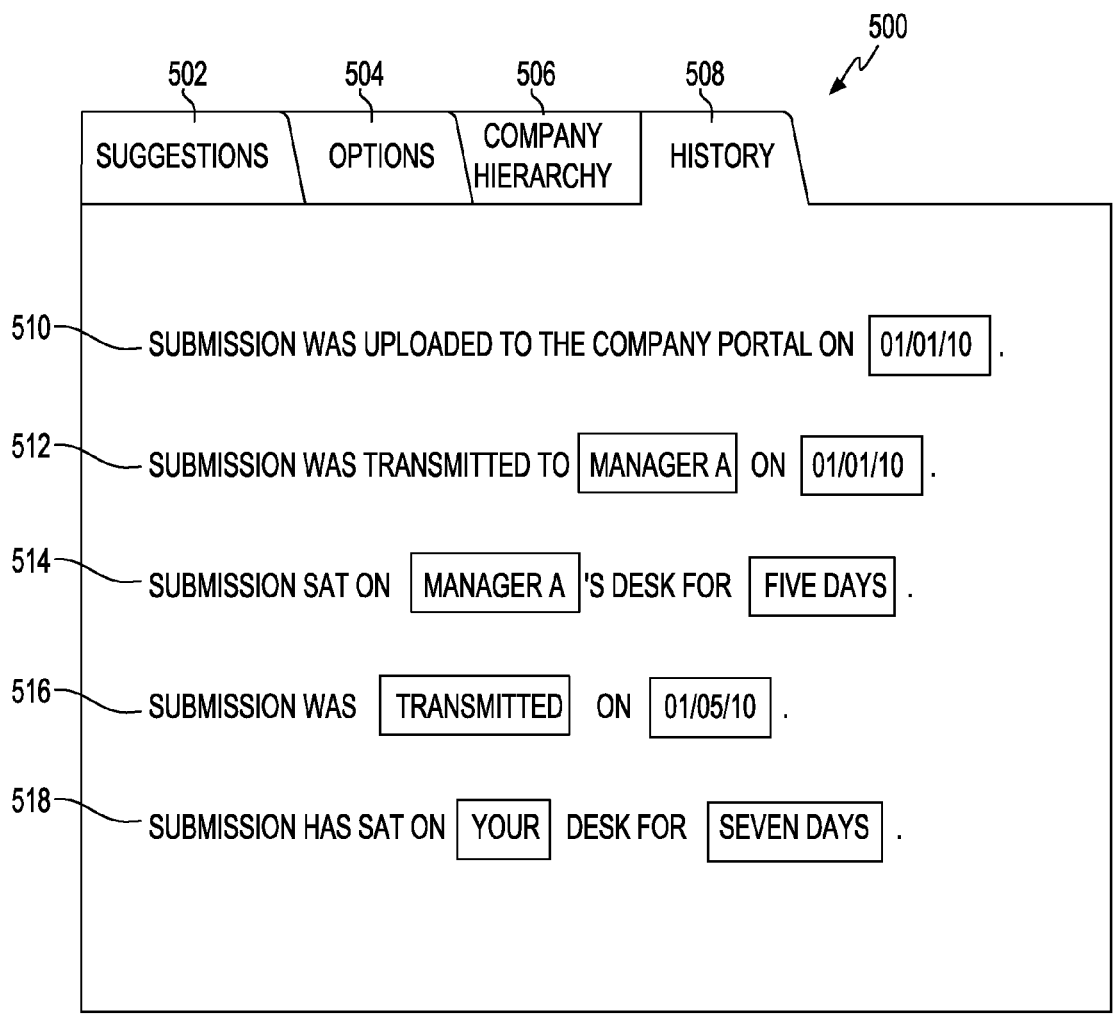
FIG. 5 shows an illustrative diagram of a fourth embodiment of a GUI according to the invention.

FIG. 5 shows an illustrative diagram of a fourth embodiment of a GUI according to the invention. The GUI of FIG. 5 may include suggestions tab 502, options tab 504, company hierarchy tab 506 and history tab 508. User selection of history tab 508 may retrieve displays 510-518. These displays may include historical information pertaining to the suggestion submitted by Employee A. Display 510 may include the date that Employee A uploaded the suggestion to the company portal.

Display 512 may include to whom the submission was transmitted following the upload. Display 512 may also include the date that the submission was transmitted. In this embodiment, the submission was electronically transmitted to Manger A following the uploading of the suggestion to the company portal.

Display 514 may include a duration of time during which the submission was available to Manager A. Display 516 may include the date that the portal transmitted the suggestion to the company president.

Display 518 may include a duration of time during which the suggestion has been available to company president. In this embodiment, the company president has accessed the GUI. Thus, display 518 states that the submission has sat on "your" desk for the displayed duration of time. In other embodiments, where the portal has not been accessed by the company president, display 518 may state that the submission has sat on the "president's" desk for the displayed duration of time.

Thus, systems and methods for providing an electronic employee feedback portal has been provided. Persons skilled in the art will appreciate that the present invention can be practiced by other than the described embodiments, which are presented for purposes of illustration rather than of limitation, and that the present invention is limited only by the claims that follow.

What is claimed is:

1. One or more computer-readable media storing computer-executable instructions which, when executed by a processor on a computer system, perform a method for providing an electronic feedback management system, the method using an electronic information processing platform, the method comprising:

receiving information relating to three levels of a company employee hierarchy, the three levels including an executive management level, a middle management level and an employee level;

receiving information relating to a submission of a suggestion by a first employee;

receiving information relating to a status of the submission, the status of the submission including an identification of a second employee who has reviewed the suggestion; and displaying to the first employee on a graphical user interface a visual representation of a path traveled by the suggestion through at least a part of the company employee hierarchy, wherein the graphical user interface:

displays the three levels of the company employee hierarchy in a vertical arrangement, a highest level corresponding to the executive management level, a lower level, with respect to the highest level, corresponding to the middle management level, and a lowest level, with respect to both the highest level and the lower level, corresponding to the employee level; and displays in the lowest level a name associated with the first employee and displays in the lower level a name associated with the second employee.

2. The medium of claim 1 wherein in the method the information relating to the status of the submission includes a date during which the suggestion was reviewed by the second employee.

3. The medium of claim 2 wherein in the method the displaying includes displaying the date that the suggestion was reviewed by the second employee.

4. The medium of claim 1 wherein the method further comprises displaying to the second employee an option to electronically attach a comment to the suggestion.

5. The medium of claim 1 wherein the method further comprises displaying to the second employee an option to electronically modify the suggestion.

6. The medium of claim 5 wherein the method further comprises an identifier that identifies the second employee who electronically modified the suggestion.

7. The medium of claim 1 wherein the method further comprises displaying to the second employee an option to transmit the suggestion to a third employee.

8. The medium of claim 7 wherein in the method the identity of the third employee is predetermined.

9. The medium of claim 1 wherein in the method the identity of the third employee is selected by the second employee.

10. The medium of claim 1 wherein the method further comprises displaying to the second employee an option to terminate the transmission of the suggestion.

11. The medium of claim 1 wherein in the method the identification of the second employee includes a second employee name.

12. The medium of claim 1 wherein in the method the identification of the second employee includes a company division that the second employee is associated with.

13. A system for providing electronic feedback management, the system using art electronic information processing platform, the system comprising:

a processor for instructing a receiving module, the instructions causing the receiving module to receive information relating to three levels of a company employee hierarchy, the three levels including an executive management level, a middle management level and an employee level, to receive information relating to a submission of a suggestion by a first employee, and to receive information relating to a status of the submission, the status of the submission including an identification of a second employee who has reviewed the suggestion; and the processor for executing a graphical user interface for displaying to the first employee a visual representation of a path traveled by the suggestion through at least a part of the company employee hierarchy, wherein the graphical user interface:
- displays the three levels of the company employee hierarchy in a vertical arrangement, a highest level corresponding to the executive management level, a lower level, with respect to the highest level, corresponding to the middle management level, and a lowest level, with respect to both the highest level and the lower level, corresponding to the employee level; and
- displays in the lowest level a name associated with the first employee and displays in the lower level a name associated with the second employee.

14. The system of claim 13 wherein the information relating to the status of the submission includes a date during which the suggestion was reviewed by the second employee.

15. The system of claim 14 wherein the displaying includes displaying the date that the suggestion was reviewed by the second employee.

16. The system of claim 13 wherein the graphical user interface is configured to display to the second employee an option to electronically attach a comment to the suggestion.

17. The system of claim 13 wherein the graphical user interface is configured to display to the second employee an option to electronically modify the suggestion.

18. The system of claim 13 wherein the graphical user interface is configured to display an identifier that identifies the second employee who electronically modified the suggestion.

19. The system of claim 13 wherein the graphical user interface is configured to display to the second employee an option to transmit the suggestion to a third employee.

20. The system of claim 19 further comprising a processing module configured to store information relating to the identity of a third employee.

21. The system of claim 19 wherein the receiving module is configurable to receive selection of the identity of the third employee by the second employee.

22. The system of claim 13 wherein the graphical user interface is configured to display to the second employee an option to terminate the transmission of the suggestion.

23. The system of claim 13 wherein the receiving module is configurable to receive a selection of the identification of the second employee that includes a second employee name.

24. The system of claim 13 wherein the receiving module is configurable to receive a selection of the identification of the second employee that includes a company division that the second employee is associated with.

* * * * *